United States Patent
Tanaka et al.

(10) Patent No.: US 9,966,623 B2
(45) Date of Patent: May 8, 2018

(54) ELECTROLYTE MEMBRANE-ELECTRODE STRUCTURE WITH RESIN FRAME FOR FUEL CELLS

(75) Inventors: Yukihito Tanaka, Saitama (JP); Kazuo Nunokawa, Utsunomiya (JP); Hiroshi Sohma, Utsunomiya (JP); Kenichi Tanaka, Utsunomiya (JP); Naoki Mitsuta, Nasukarasuyama (JP); Masashi Sugishita, Utsunomiya (JP); Daisuke Okonogi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 14/346,377

(22) PCT Filed: Sep. 6, 2012

(86) PCT No.: PCT/JP2012/072698
§ 371 (c)(1),
(2), (4) Date: Mar. 21, 2014

(87) PCT Pub. No.: WO2013/042542
PCT Pub. Date: Mar. 28, 2013

(65) Prior Publication Data
US 2014/0234749 A1 Aug. 21, 2014

(30) Foreign Application Priority Data

Sep. 22, 2011 (JP) .................. 2011-207134

(51) Int. Cl.
*H01M 8/10* (2016.01)
*H01M 8/1004* (2016.01)
(Continued)

(52) U.S. Cl.
CPC ....... *H01M 8/1004* (2013.01); *H01M 8/0267* (2013.01); *H01M 8/0271* (2013.01);
(Continued)

(58) Field of Classification Search
CPC ............ H01M 8/0271–8/0284; H01M 8/1004; H01M 8/0267; H01M 8/0286; H01M 2008/1095
See application file for complete search history.

(56) References Cited

U.S. PATENT DOCUMENTS 7,005,208 B2  2/2006  Suenaga et al.
7,709,123 B2  5/2010  Kawabata et al.
(Continued)

FOREIGN PATENT DOCUMENTS

DE       10151380 A1    6/2002
DE    112007000860 T5    9/2009
(Continued)

OTHER PUBLICATIONS

Office Action dated Mar. 26, 2015 issued in the corresponding German Patent Application No. 112012003942.4 with English translation.

*Primary Examiner* — Milton I Cano
*Assistant Examiner* — Philip A Stuckey
(74) *Attorney, Agent, or Firm* — Carrier Blackman & Associates, P.C.; William D. Blackman; Joseph P. Carrier

(57) ABSTRACT

An electrolyte membrane-electrode structure with a resin frame is provided with: an electrolyte membrane-electrode structure that is provided with an anode-side electrode and a cathode-side electrode, with a solid polymer electrolyte membrane being held therebetween; and a resin frame member that is arranged around the outer periphery of the solid polymer electrolyte membrane. An intermediate layer is continuously arranged: between an outer peripheral end portion of the cathode-side electrode and a first inner peripheral end portion of the resin frame member; on an outer peripheral end portion of the solid polymer electrolyte membrane, said outer peripheral end portion being exposed outside the outer peripheral end portion of the cathode-side (Continued)

electrode; and between an outer peripheral end portion of the anode-side electrode and a second inner peripheral end portion of the resin frame member.

7 Claims, 18 Drawing Sheets

(51) Int. Cl.
    *H01M 8/0267*     (2016.01)
    *H01M 8/0271*     (2016.01)
    *H01M 8/0273*     (2016.01)
    *H01M 8/0276*     (2016.01)
    *H01M 8/0286*     (2016.01)
    *H01M 8/1018*     (2016.01)
    *H01M 8/0284*     (2016.01)

(52) U.S. Cl.
    CPC ....... *H01M 8/0273* (2013.01); *H01M 8/0276* (2013.01); *H01M 8/0286* (2013.01); *H01M 8/0284* (2013.01); *H01M 2008/1095* (2013.01)

(56) References Cited

U.S. PATENT DOCUMENTS

| | | |
|---|---|---|
| 7,993,499 B2 | 8/2011 | Zuber et al. |
| 8,343,321 B2 | 1/2013 | Zuber et al. |
| 8,394,551 B2 | 3/2013 | Zuber et al. |
| 2005/0014056 A1 | 1/2005 | Zuber et al. |
| 2007/0003821 A1* | 1/2007 | Belchuk .............. H01M 8/0273 |
| | | 429/465 |
| 2007/0042261 A1* | 2/2007 | Kohyama ........... H01M 8/0247 |
| | | 429/480 |
| 2010/0047649 A1 | 2/2010 | Yamada et al. |
| 2012/0219874 A1 | 8/2012 | Suzuki et al. |
| 2013/0177832 A1* | 7/2013 | Tsubosaka .......... H01M 8/0271 |
| | | 429/480 |

FOREIGN PATENT DOCUMENTS

| | | |
|---|---|---|
| JP | 07-065847 A | 3/1995 |
| JP | 2007-066766 A | 3/2007 |
| JP | 2008-041337 A | 2/2008 |
| JP | 2009-158391 A | 7/2009 |
| JP | 2011-040290 A | 2/2011 |
| WO | WO 2012035591 A1 * | 3/2012 .......... H01M 8/0271 |

* cited by examiner

ELECTROLYTE MEMBRANE-ELECTRODE STRUCTURE WITH RESIN FRAME FOR FUEL CELLS

TECHNICAL FIELD

The present invention relates to a fuel cell resin frame equipped membrane electrode assembly (electrolyte membrane-electrode structure with resin frame for fuel cells) including a membrane electrode assembly and a resin frame member. The membrane electrode assembly includes a first electrode, a second electrode, and a solid polymer electrolyte membrane interposed between the first electrode and the second electrode. The first electrode and the second electrode include electrode catalyst layers and gas diffusion layers, respectively. The first electrode has an outer size smaller than that of the second electrode. The resin frame member is provided around an outer end of the solid polymer electrolyte membrane.

BACKGROUND ART

In general, a solid polymer electrolyte fuel cell employs a solid polymer electrolyte membrane. The solid polymer electrolyte membrane is a polymer ion exchange membrane. The fuel cell includes a membrane electrode assembly (MEA) where an anode and a cathode are provided on both sides of the solid polymer electrolyte membrane. Each of the anode and the cathode includes a catalyst layer (electrode catalyst layer) and a gas diffusion layer (porous carbon). In the fuel cell, the membrane electrode assembly is sandwiched between separators (bipolar plates). A predetermined number of the fuel cells are stacked together to form a fuel cell stack. In use, for example, the fuel cell stack is mounted in a vehicle as an in-vehicle fuel cell stack.

In some cases, the membrane electrode assembly has structure where components of the MEA (stepped MEA) have different sizes, i.e., the surface area of one of gas diffusion layers is smaller than the surface area of the solid polymer electrolyte membrane, and the surface area of the other of the gas diffusion layers is the same as the surface area of the solid polymer electrolyte membrane.

Normally, in the fuel cell stack, a large number of membrane electrode assemblies are stacked together. In order to reduce the cost, there is a demand to produce the membrane electrode assembly at low cost. Therefore, in particular, for the purpose of reducing the amount of expensive material used for the solid polymer electrolyte membrane, and simplify the structure of the solid polymer electrolyte membrane, various proposals have been made.

For example, as shown in FIG. 18, a membrane electrode assembly disclosed in Japanese Laid-Open Patent Publication No. 2007-066766 includes an electrolyte membrane 1, a cathode catalyst layer 2a provided on one side of the electrolyte membrane 1, an anode catalyst layer 2b provided on the other surface of the electrolyte membrane 1, and gas diffusion layers 3a, 3b provided on both sides of the electrolyte membrane 1.

The surface area of the gas diffusion layer 3b of the anode is equal to the surface area of the electrolyte membrane 1, and larger than the surface area of the gas diffusion layer 3a of the cathode. A gasket structure body 4 is provided in an edge area of the membrane electrode assembly (MEA), and the outer end of the electrolyte membrane 1 adjacent to the gas diffusion layer 3a is joined to the gasket structure body 4 through an adhesive layer 5.

SUMMARY OF INVENTION

However, in Japanese Laid-Open Patent Publication No. 2007-066766, the MEA and the gasket structure body 4 are fixed to the outer marginal portion of the electrolyte membrane 1 exposed to the outside from the gas diffusion layer 3a, through the adhesive layer 5 only. Therefore, the strength of joining the MEA and the gasket structure body 4 is low, and the desired strength cannot be obtained.

Further, it is considerably difficult to produce the membrane electrode assembly such that the outer ends of the gas diffusion layers 3a, 3b and the inner end of the gasket structure body 4 are tightly joined together in an air tight manner. Therefore, a gap tends to be formed between the outer ends of the gas diffusion layers 3a, 3b and the inner end of the gasket structure body 4. The sealing performance for preventing gas leakage is low, and the fuel gas and the oxygen-containing gas are mixed disadvantageously.

The present invention has been made to solve the problems of this type, and an object of the present invention is to provide a fuel cell resin frame equipped membrane electrode assembly in which a resin frame member is joined firmly and easily around an outer end of a solid polymer electrolyte membrane, and desired sealing performance for preventing gas leakage is maintained reliably.

The present invention relates to a fuel cell resin frame equipped membrane electrode assembly including a membrane electrode assembly and a resin frame member. The membrane electrode assembly includes a first electrode, a second electrode, and a solid polymer electrolyte membrane interposed between the first electrode and the second electrode. Each of the first electrode and the second electrode includes an electrode catalyst layer and a gas diffusion layer. The first electrode has an outer size smaller than that of the second electrode. The resin frame member is provided around an outer end of the solid polymer electrolyte membrane.

In the fuel cell resin frame equipped membrane electrode assembly, an intermediate layer is provided between an outer end of the first electrode and an inner end of the resin frame member, at an outer marginal portion of the solid polymer electrolyte membrane exposed from the outer end of the first electrode to outside, and between an outer end of the second electrode and an inner end of the resin frame member, in a contiguous manner.

Further, in the fuel cell resin frame equipped membrane electrode assembly, preferably, the intermediate layer is made of material different from that of the resin frame member.

Further, in the fuel cell resin frame equipped membrane electrode assembly, preferably, an outer marginal portion of at least one of the gas diffusion layers is impregnated with same material composition as that of the intermediate layer to form an impregnation layer.

Further, in the fuel cell resin frame equipped membrane electrode assembly, preferably, the gas diffusion layer is impregnated with the impregnation layer at a pore filling rate of 85% or more.

Further, in the fuel cell resin frame equipped membrane electrode assembly, preferably, a first gap is formed between one end of the intermediate layer, the outer end of the first electrode, and the inner end of the resin frame member; a second gap is formed between another end of the intermediate layer, the outer end of the second electrode, and the inner end of the resin frame member; a first projection provided integrally with or separately from the resin frame member is melted to form a first resin impregnation portion in the first gap; and a second projection provided integrally with or separately from the resin frame member is melted to form a second resin impregnation portion in the second gap.

In the present invention, the intermediate layer is provided at the outer marginal portion of the solid polymer electrolyte membrane exposed from the outer end of the first electrode to the outside. Additionally, the intermediate layer is provided between the outer end of the first electrode and the inner end of the resin frame member, and between the outer end of the second electrode and the inner end of the resin frame member in a contiguous manner.

In the structure, in comparison with the case where the resin frame member is joined to the first electrode and the second electrode by adhesion, the joining strength for joining the resin frame member to the first electrode and the second electrode is improved suitably, and it is possible to suppress occurrence of peeling or the like as much as possible. Further, no gap is formed between the outer end of the first electrode and the inner end of the resin frame member, and no gap is formed between the outer end of the second electrode and the inner end of the resin frame member. Therefore, it becomes possible to maintain the desired sealing performance for preventing the gas leakage. With the simple and economical structure, mixture of the fuel gas and the oxygen-containing gas can be suppressed as much as possible.

DESCRIPTION OF EMBODIMENTS

Figure 1:
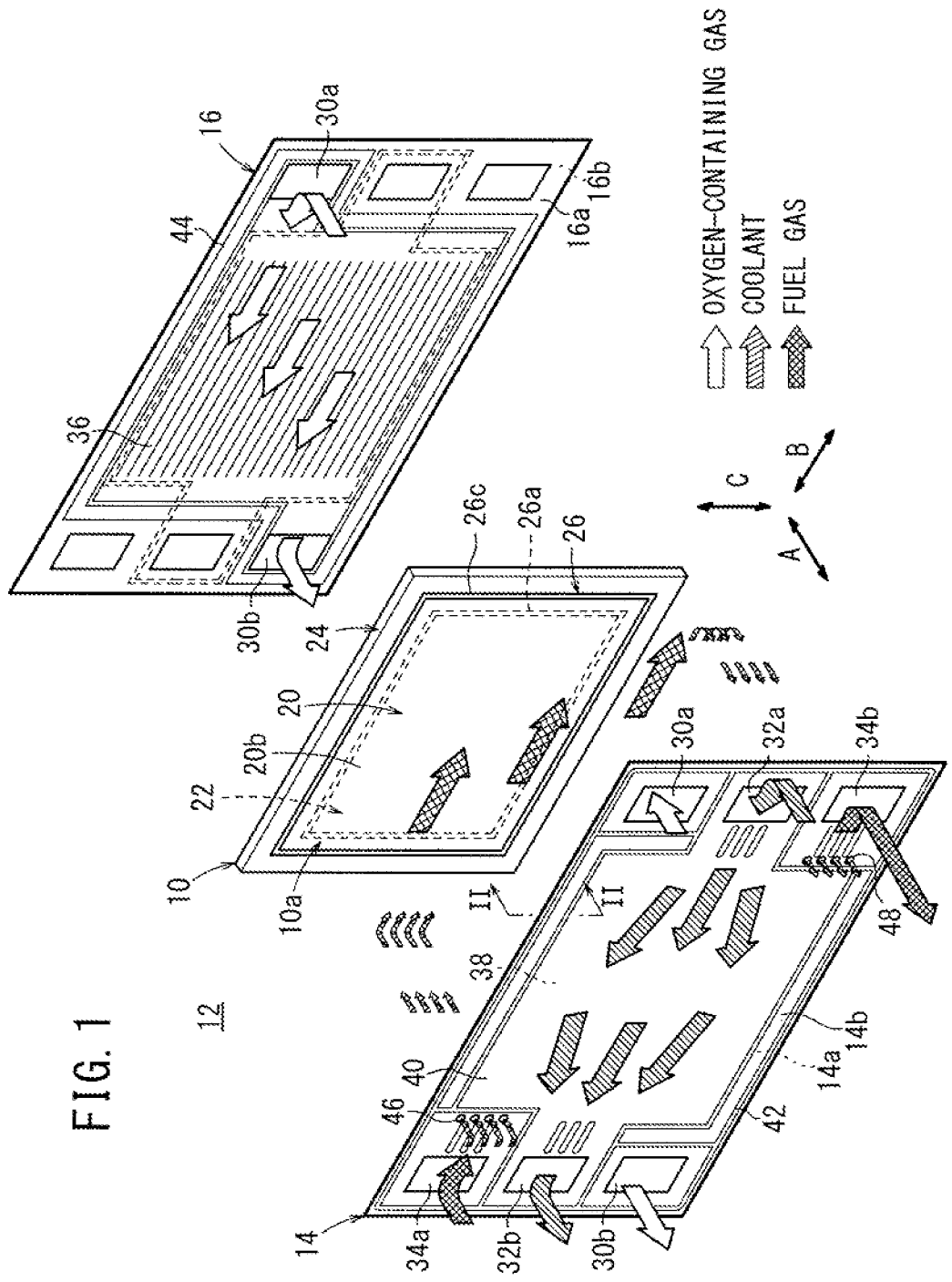
FIG. 1 is an exploded perspective view showing main components of a solid polymer electrolyte fuel cell including a resin frame equipped membrane electrode assembly according to a first embodiment of the present invention.
Figure 2:
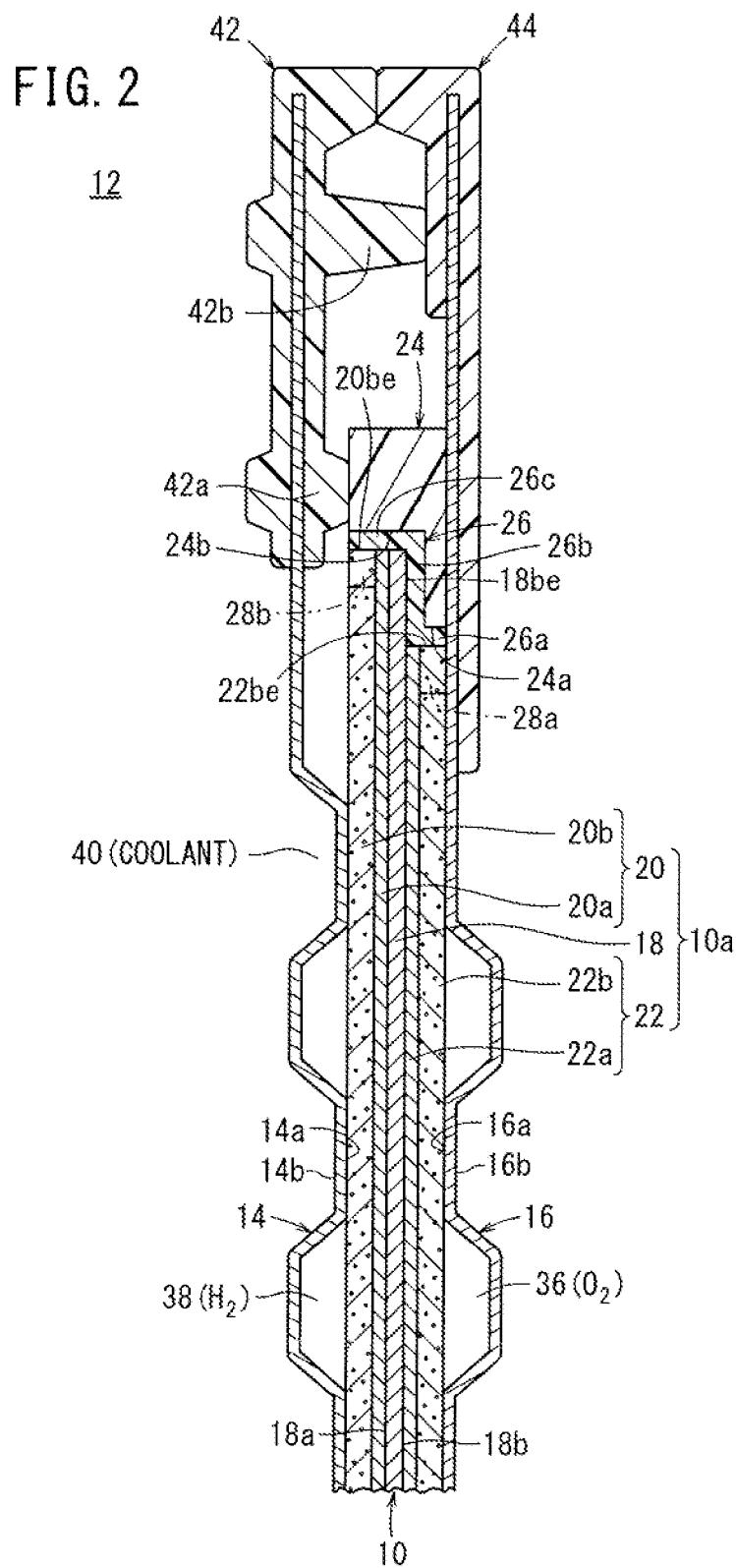
FIG. 2 is a cross sectional view showing the fuel cell, taken along a line II-II in FIG. 1.

As shown in FIGS. 1 and 2, a solid polymer electrolyte fuel cell 12 including a resin frame equipped membrane electrode assembly 10 according to a first embodiment of the present invention is formed by sandwiching the resin frame equipped membrane electrode assembly 10 between a first separator 14 and a second separator 16. For example, the first separator 14 and the second separator 16 are made of metal plates such as steel plates, stainless steel plates, aluminum plates, plated steel sheets, or metal plates having anti-corrosive surfaces by surface treatment. Alternatively, carbon members may be used as the first separator 14 and the second separator 16.

As shown in FIG. 2, the resin frame equipped membrane electrode assembly 10 includes a membrane electrode assembly 10a, and the membrane electrode assembly 10a includes a solid polymer electrolyte membrane 18, and an anode (second electrode) 20 and a cathode (first electrode) 22 sandwiching the solid polymer electrolyte membrane 18. The solid polymer electrolyte membrane 18 is formed by impregnating a thin membrane of perfluorosulfonic acid with water, for example. A fluorine based electrolyte may be used as the solid polymer electrolyte membrane 18. Alternatively, an HC (hydrocarbon) based electrolyte may be used as the solid polymer electrolyte membrane 18.

The surface area of the cathode 22 is smaller than the surface areas of the solid polymer electrolyte membrane 18 and the anode 20. Alternatively, the surface area of the cathode 22 may be larger than the surface area of the anode 20. As long as the outer marginal portion of the solid polymer electrolyte membrane 18 protrudes beyond the outer end of the smaller electrode, e.g., the outer end of the cathode 22, the outer marginal portion of the solid polymer electrolyte membrane 18 may not be aligned with the end of the larger electrode, e.g., the end of the anode 20.

The anode 20 is provided on one surface 18a of the solid polymer electrolyte membrane 18 and the cathode 22 is provided on another surface 18b of the solid polymer electrolyte membrane 18 such that a frame shaped outer end 18be of the solid polymer electrolyte membrane 18 is exposed.

The anode 20 includes an electrode catalyst layer 20a joined to the surface 18a of the solid polymer electrolyte membrane 18 and a gas diffusion layer 20b stacked on the electrode catalyst layer 20a. The cathode 22 includes an electrode catalyst layer 22a joined to the surface 18b of the solid polymer electrolyte membrane 18 and a gas diffusion layer 22b stacked on the electrode catalyst layer 22a.

Each of the electrode catalyst layers 20a, 22a is formed by carbon black supporting platinum particles as catalyst particles. As an ion conductive binder, polymer electrolyte is used. Catalyst paste formed by mixing the catalyst particles uniformly in the solution of this polymer electrolyte is printed, applied (coated) or transferred on both surfaces of the solid polymer electrolyte membrane 18 to form the electrode catalyst layers 20a, 22a. The gas diffusion layers 20b, 22b are made of carbon paper or the like, and the surface size of the gas diffusion layer 20b is larger that the surface size of the gas diffusion layer 22b.

Figure 3:
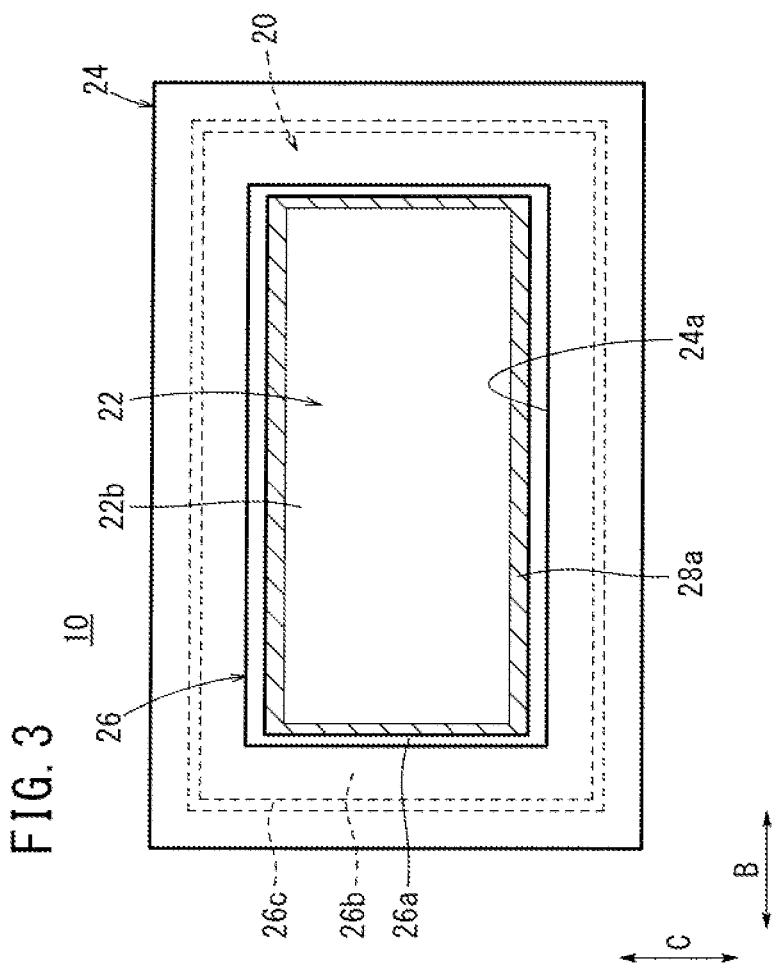
FIG. 3 is a front view showing a cathode of the resin frame equipped membrane electrode assembly.
Figure 4:
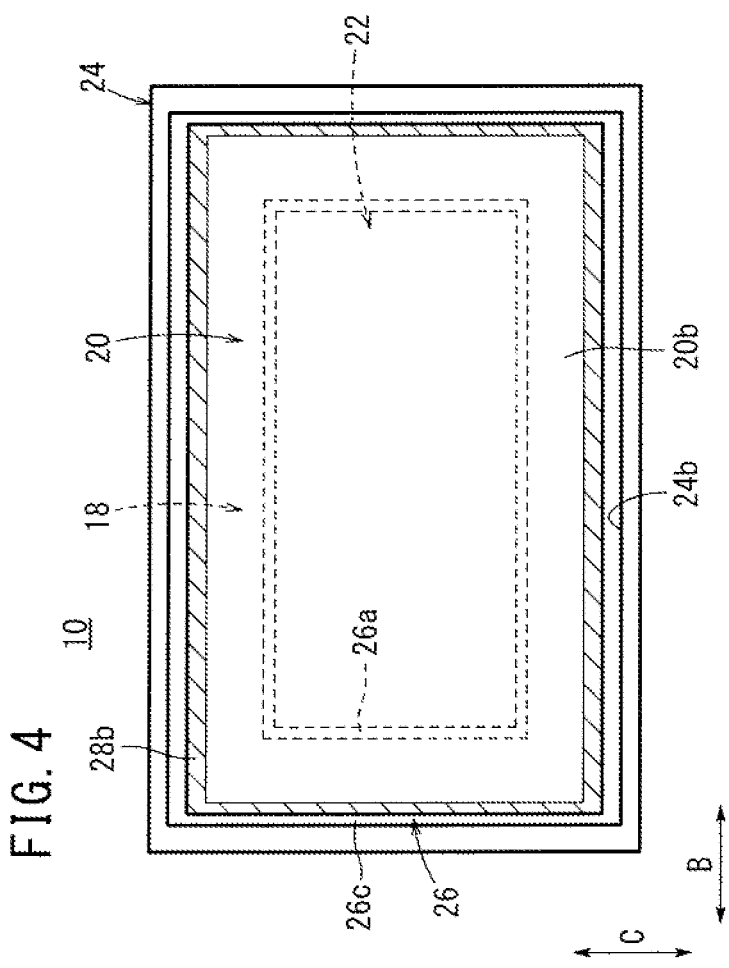
FIG. 4 is a front view showing an anode of the resin frame equipped membrane electrode assembly.

As shown in FIGS. 2 through 4, the resin frame equipped membrane electrode assembly 10 includes a resin frame member 24 provided around the outer end of the solid polymer electrolyte membrane 18, and joined to the cathode 22 and the anode 20. For example, the resin frame member 24 is made of PPS (polyphenylene sulfide), PPA (polyphthalamide), etc. Alternatively, the resin frame member 24 may be made of polymer material having elasticity.

A stepped opening is formed inside the resin frame member 24, and includes a first inner end 24a positioned on the inner side, and a second inner end 24b positioned outside the first inner end 24a. An intermediate layer 26 is provided between the resin frame member 24 and the membrane electrode assembly 10a.

The intermediate layer 26 includes a first plate portion 26a, a second plate portion 26b, and a third plate portion 26c that are contiguous to one another. The first plate portion 26a is provided between an outer end 22be of the gas diffusion layer 22b of the cathode 22 and the first inner end 24a of the resin frame member 24. The second plate portion 26b is provided at the outer end 18be of the solid polymer electrolyte membrane 18 exposed from the outer end 22be to the outside. The third plate portion 26c is provided between an outer end 20be of the gas diffusion layer 20b of the anode 20 and the second inner end 24b of the resin frame member 24.

The intermediate layer 26 has a substantially Z shape in cross section, and made of material different from that of the resin frame member 24. Specifically, a silicone based rubber (elastomer) a fluoro rubber (elastomer), epoxy based resin (elastomer), urethane based resin (elastomer), modified PET (polyethylene terephthalate) resin (elastomer), PVDF (polyvinylidene fluoride) resin (elastomer), orefin based resin (elastomer), or hot melt material may be used for the intermediate layer 26.

An outer marginal portion of the gas diffusion layer 22b of the cathode 22 is impregnated with the same material composition as that of the intermediate layer 26 to form a first impregnation layer 28a. The first impregnation layer 28a has a predetermined area inside of the outer end position. An outer marginal portion of the gas diffusion layer 20b of the anode 20 is impregnated with the same material composition as that of the intermediate layer 26 to form a second impregnation layer 28b. The second impregnation layer 28b has a predetermined area inside of the outer end position. The gas diffusion layer 22b and the gas diffusion layer 20b are impregnated with the first impregnation layer 28a and the second impregnation layer 28b at a pore filling rate of 85% or more, respectively.

As shown in FIG. 3, the first impregnation layer 28a is formed over the entire periphery of the gas diffusion layer 22b of the cathode 22. As shown in FIG. 4, the second impregnation layer 28b is formed over the entire periphery of the gas diffusion layer 20b of the anode 20.

As shown in FIG. 1, at one end marginal portion of the fuel cell 12 in a direction indicated by an arrow B (horizontal direction in FIG. 1), an oxygen-containing gas supply passage 30a for supplying an oxygen-containing gas, a coolant supply passage 32a for supplying a coolant, and a fuel gas discharge passage 34b for discharging a fuel gas such as a hydrogen-containing gas are arranged in a vertical direction indicated by an arrow C. The oxygen-containing gas supply passage 30a, the coolant supply passage 32a, and the fuel gas discharge passage 34b extend through the fuel cell 12 in a stacking direction indicated by an arrow A.

At the other end marginal portion of the fuel cell 12 in the direction indicated by the arrow B, a fuel gas supply passage 34a for supplying the fuel gas, a coolant discharge passage 32b for discharging the coolant, and an oxygen-containing gas discharge passage 30b for discharging the oxygen-containing gas are arranged in the direction indicated by the arrow C. The fuel gas supply passage 34a, the coolant discharge passage 32b, and the oxygen-containing gas discharge passage 30b extend through the fuel cell 12 in the direction indicated by the arrow A.

The second separator 16 has an oxygen-containing gas flow field 36 on its surface 16a facing the resin frame equipped membrane electrode assembly 10. The oxygen-containing gas flow field 36 is connected to the oxygen-containing gas supply passage 30a and the oxygen-containing gas discharge passage 30b.

The first separator 14 has a fuel gas flow field 38 on its surface 14a facing the resin frame equipped membrane electrode assembly 10. The fuel gas flow field 38 is connected to the fuel gas supply passage 34a and the fuel gas discharge passage 34b. A coolant flow field 40 is formed between a surface 14b of the first separator 14 and a surface 16b of the second separator 16. The coolant flow field 40 is connected to the coolant supply passage 32a and the coolant discharge passage 32b.

As shown in FIGS. 1 and 2, a first seal member 42 is formed integrally with the surfaces 14a, 14b of the first separator 14, around the outer end of the first separator 14. A second seal member 44 is formed integrally with the surfaces 16a, 16b of the second separator 16, around the outer end of the second separator 16.

As shown in FIG. 2, the first seal member 42 includes a first ridge seal 42a which contacts the resin frame member 24 of the resin frame equipped membrane electrode assembly 10, and a second ridge seal 42b which contacts the second seal member 44 of the second separator 16. The second seal member 44 is a flat surface seal. Instead of providing the second ridge seal 42b, the second seal member 44 may have a ridge seal (not shown).

Each of the first seal member 42 and the second seal members 44 is made of an elastic seal member, e.g., seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 1, the first separator 14 has supply holes 46 connecting the fuel gas supply passage 34a to the fuel gas flow field 38, and discharge holes 48 connecting the fuel gas flow field 38 to the fuel gas discharge passage 34b.

Next, a method of producing the resin frame equipped membrane electrode assembly 10 will be described below.

Figure 5:
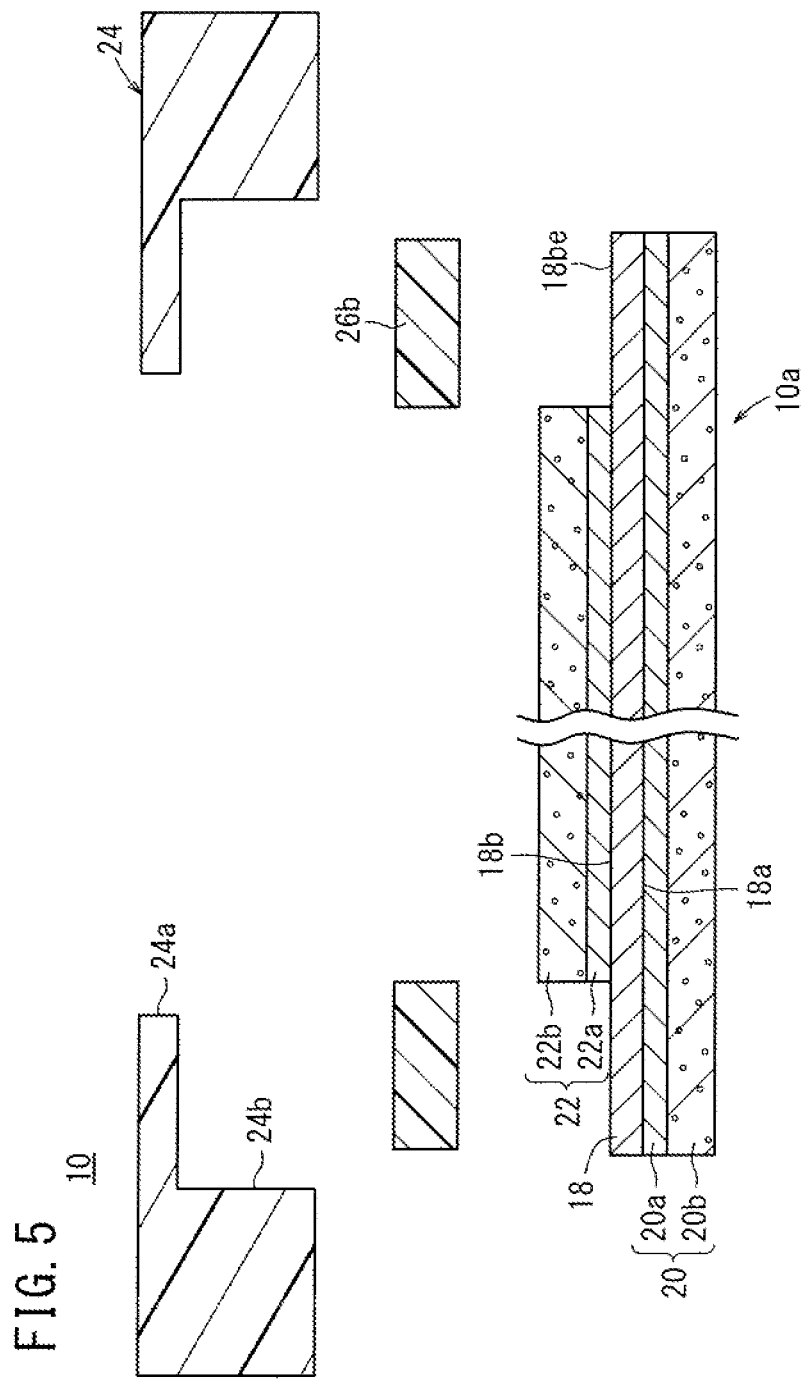
FIG. 5 is a view showing a method of producing the resin frame equipped membrane electrode assembly.

Firstly, as shown in FIG. 5, the membrane electrode assembly 10a as an MEA having different sizes of components is produced. Specifically, the electrode catalyst layers 20a, 22a are coated on both surfaces 18a, 18b of the solid polymer electrolyte membrane 18. Then, the gas diffusion layer 20b is placed on a side of a surface 18a of the solid polymer electrolyte membrane 18, i.e., the gas diffusion layer 20b is placed on the electrode catalyst layer 20a. The gas diffusion layer 22b is placed on a surface 18b of the solid polymer electrolyte membrane 18, i.e., the gas diffusion layer 22b is placed on the electrode catalyst layer 22a. These components are stacked together, and subjected to hot pressing treatment to produce the membrane electrode assembly 10a.

The resin frame member 24 is formed by an injection molding machine (not shown) beforehand. The resin frame member 24 is aligned with the membrane electrode assembly 10a. The resin frame member 24 includes the first inner end 24a and the second inner end 24b. In the membrane electrode assembly 10a, the frame shaped outer end 18be of the solid polymer electrolyte membrane 18 is exposed, and the second plate portion 26b of the intermediate layer 26 is provided in correspondence with the outer end 18be.

Figure 6:
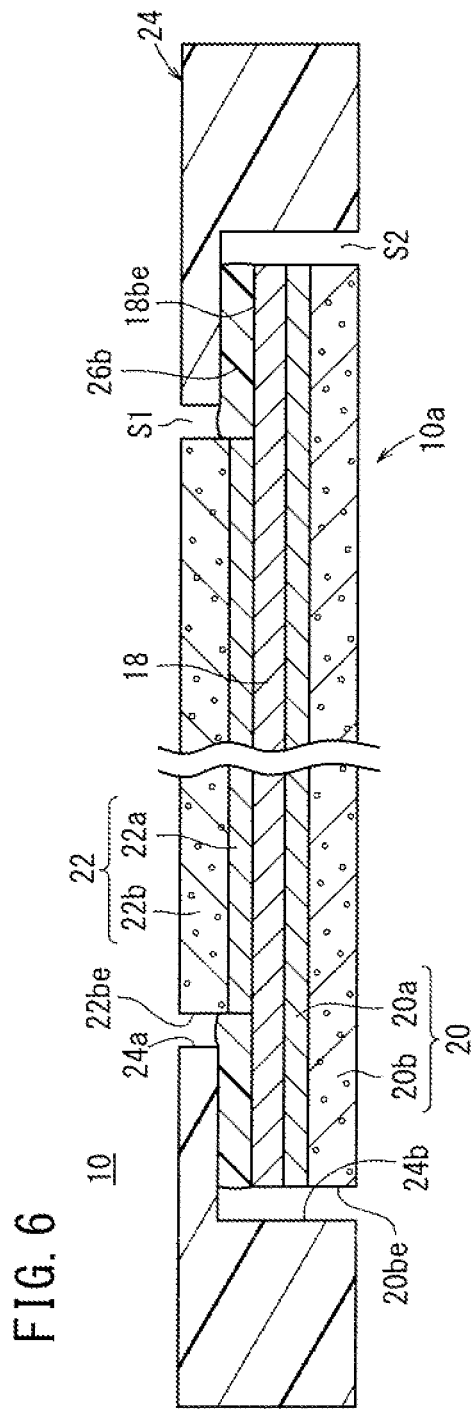
FIG. 6 is a view showing the method of producing the resin frame equipped membrane electrode assembly.

Then, as shown in FIG. 6, the cathode 22 of the membrane electrode assembly 10a is placed at the first inner end 24a of the resin frame member 24, and the solid polymer electrolyte membrane 18 and the anode 20 are placed at the second inner end 24b. Thus, the resin frame member 24 and the membrane electrode assembly 10a are joined together through the second plate portion 26b. Further, a gap S1 is formed between the first inner end 24a and the outer end 22be of the gas diffusion layer 22b of the cathode 22, and a gap S2 is formed between the second inner end 24b and the outer end 20be of the gas diffusion layer 20b of the anode 20.

Figure 7:
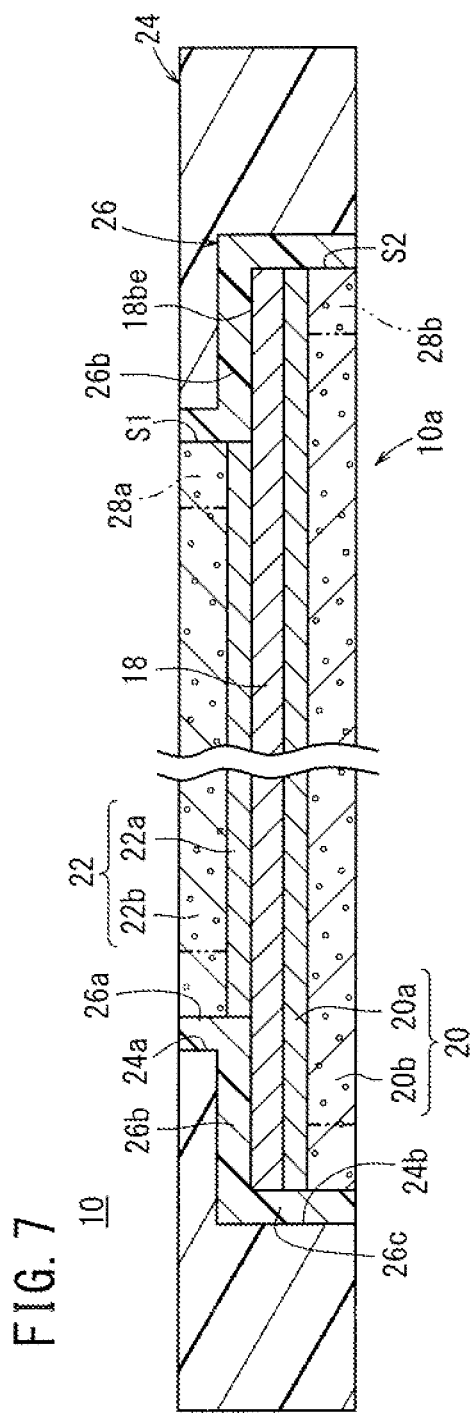
FIG. 7 is a view showing the method of producing the resin frame equipped membrane electrode assembly.

Then, as shown in FIG. 7, material of the intermediate layer 26 which is the same as the second plate portion 26b is injected into each of the gaps S1, S2. Therefore, the material filled in the gaps S1, S2 is hardened to form the first plate portion 26a and the third plate portion 26c, and these components are joined to the second plate portion 26b to form the intermediate layer 26. As long as the first plate portion 26a, the second plate portion 26b, and the third plate portion 26c can be joined together suitably, the first plate portion 26a, the second plate portion 26b, and the third plate portion 26c may have different material compositions.

The gas diffusion layers 22b, 20b are impregnated with the injected material. Therefore, the first impregnation layer 28a is provided at the outer marginal portion of the gas diffusion layer 22b, in a predetermined area inside the outer end position. The second impregnation layer 28b is provided at the outer marginal portion of the gas diffusion layer 20b, in a predetermined area inside the outer end position.

Figure 8:
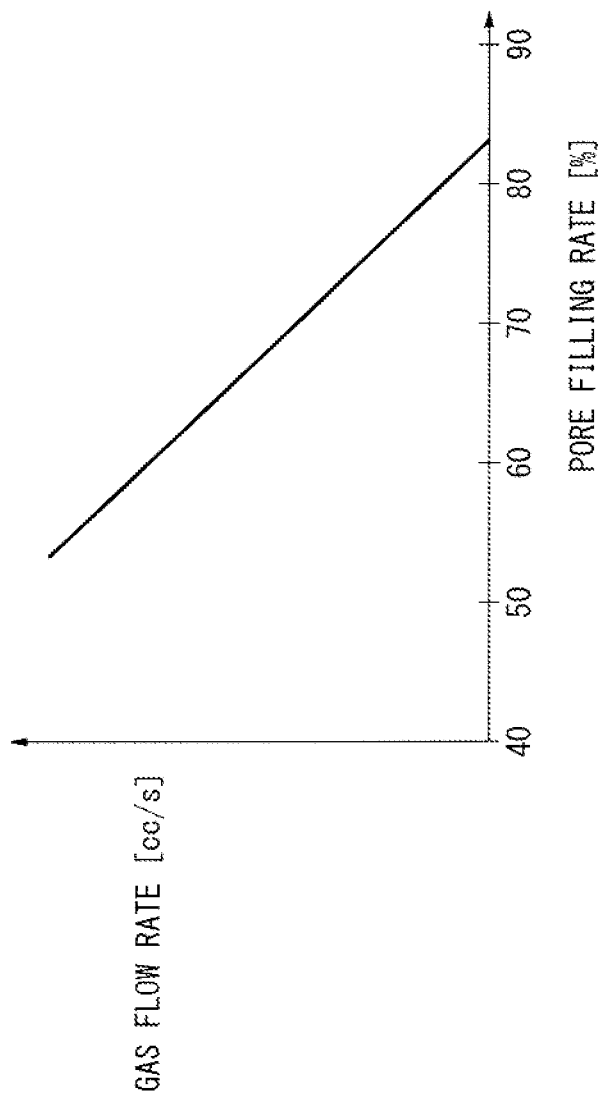
FIG. 8 is a graph showing the relationship between the pore filling rate and the gas flow rate.

At this time, the gas diffusion layer 22b and the gas diffusion layer 20b are impregnated with the first impregnation layer 28a and the second impregnation layer 28b, respectively, at the pore filling rate of 85% or more. As a result of evaluation, e.g., by a perm-porometer, it has been proven that the pore filling rate and the gas flow rate at the gas diffusion layer have a relationship as shown in FIG. 8. As can be seen from FIG. 8, at the pore filling rate of 85% or more, the gas leakage can be prevented reliably.

In the first embodiment, the intermediate layer 26 is provided between the resin frame member 24 and the membrane electrode assembly 10a. The intermediate layer 26 includes the first plate portion 26a, the second plate portion 26b, and the third plate portion 26c that are contiguous to one another. The first plate portion 26a is provided between the outer end 22be of the gas diffusion layer 22b of the cathode 22 and the first inner end 24a of the resin frame member 24 without any gap. The second plate portion 26b is provided between the outer end 18be of the solid polymer electrolyte membrane 18 membrane and the resin frame member, the outer end 18be being exposed from the outer end 22be, and the second plate portion may extend in a direction substantially parallel to the solid polymer electrolyte membrane, as shown. The third plate portion 26c is provided between the outer end 20be of the gas diffusion layer 20b of the anode 20 and the second inner end 24b of the resin frame member 24 without any gap.

Moreover, the first impregnation layer 28a and the second impregnation layer 28b are provided at the gas diffusion layer 22b and the gas diffusion layer 20b. It should be noted that only the first impregnation layer 28a or the second impregnation layer 28b may be provided.

Thus, in comparison with the case where the resin frame member 24 is joined to the cathode 22 and the anode 20 by adhesion, the joining strength for joining the resin frame member 24 to the cathode 22 and the anode 20 is improved suitably, and it is possible to suppress occurrence of peeling or the like as much as possible.

Further, no gap is formed between the first inner end 24a and the outer end 22be of the gas diffusion layer 22b of the cathode 22, and no gap is formed between the second inner end 24b and the outer end 20be of the gas diffusion layer 20b of the anode 20. Therefore, it becomes possible to maintain the desired sealing performance for preventing the gas leakage. With the simple and economical structure, mixture of the fuel gas and the oxygen-containing gas can be suppressed as much as possible advantageously.

Operation of the fuel cell 12 having the above structure will be described.

Firstly, as shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, or oil is supplied to the coolant supply passage 32a.

Thus, the oxygen-containing gas flows from the oxygen-containing gas supply passage 30a to the oxygen-containing gas flow field 36 of the second separator 16. The oxygen-containing gas moves in the direction indicated by the arrow B, and the oxygen-containing gas is supplied to the cathode 22 of the membrane electrode assembly 10a. In the meanwhile, the fuel gas flows from the fuel gas supply passage 34a through the supply holes 46 into the fuel gas flow field 38 of the first separator 14. The fuel gas flows along the fuel gas flow field 38 in the direction indicated by the arrow B, and the fuel gas is supplied to the anode 20 of the membrane electrode assembly 10a.

Thus, in each of the membrane electrode assemblies 10a, the oxygen-containing gas supplied to the cathode 22 and the fuel gas supplied to the anode 20 are partially consumed in the electrochemical reactions in the electrode catalyst layers for generating electricity.

Then, the oxygen-containing gas partially consumed at the cathode 22 flows along the oxygen-containing gas discharge passage 30b, and the oxygen-containing gas is discharged in the direction indicated by the arrow A. Likewise, the fuel gas partially consumed at the anode 20 flows through the discharge holes 48. Then, the fuel gas flow along the fuel gas discharge passage 34b, and the fuel gas is discharged in the direction indicated by the arrow A.

Further, the coolant supplied to the coolant supply passage 32a flows into the coolant flow field 40 between the first separator 14 and the second separator 16. Then, the coolant flows in the direction indicated by the arrow B. After the coolant cools the membrane electrode assembly 10a, the coolant is discharged into the coolant discharge passage 32b.

Next, another method of producing the resin frame equipped membrane electrode assembly 10 will be described below.

Figure 9:
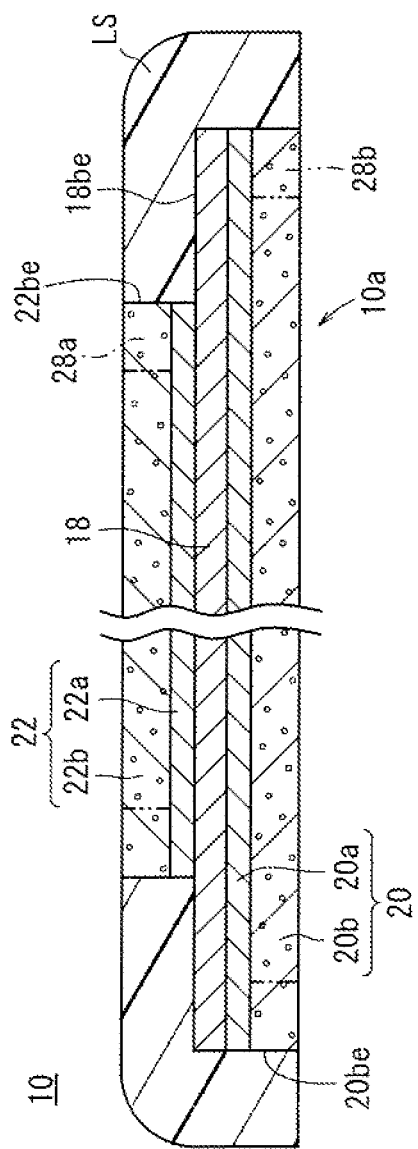
FIG. 9 is a view showing another method of producing the resin frame equipped membrane electrode assembly.

Firstly, as shown in FIG. 9, the membrane electrode assembly 10a is produced in the same manner as described above. Thereafter, a liquid seal LS made of the same material as the intermediate layer 26 is formed integrally with the outer end of the membrane electrode assembly 10a. The liquid seal LS covers the outer end 22be of the gas diffusion layer 22b of the cathode 22, the outer end 18be of the solid polymer electrolyte membrane 18, and the outer end 20be of the gas diffusion layer 20b of the anode 20. The first impregnation layer 28a and the second impregnation layer 28b are joined together by the liquid seal LS.

Figure 10:
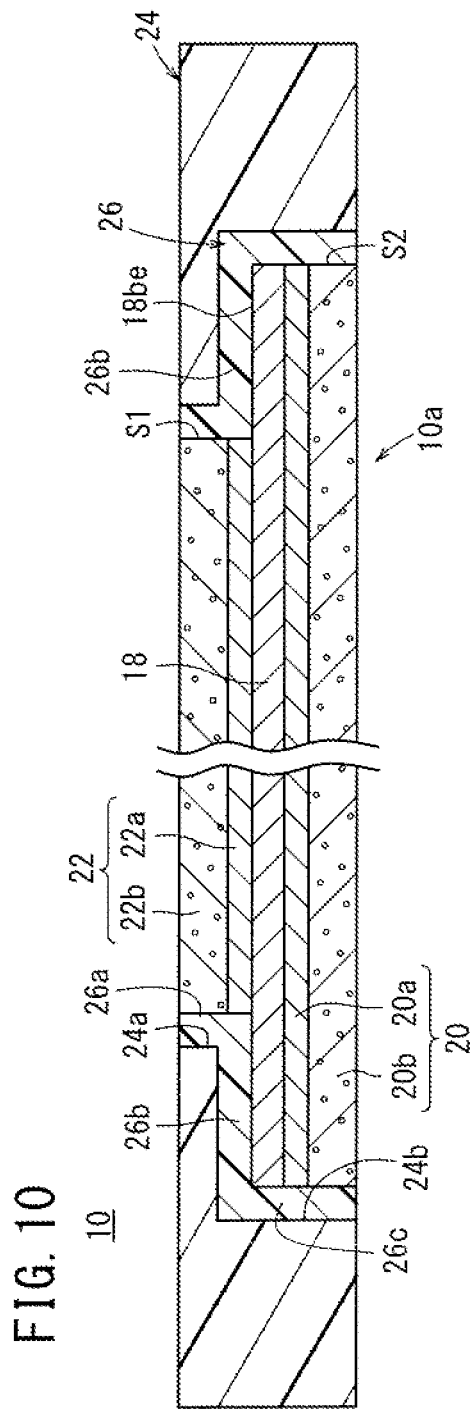
FIG. 10 is a view showing another method of producing the resin frame equipped membrane electrode assembly.

After the liquid seal LS is semi-hardened, as shown in FIG. 10, the resin frame member 24 and the membrane electrode assembly 10a are joined together. Therefore, the semi-hardened liquid seal LS flows into and is hardened in the gaps S1, S2 formed between the membrane electrode assembly 10a and the resin frame member 24. Thus, by removing burr (not shown) which is present outside the resin frame member 24, the resin frame equipped membrane electrode assembly 10 is obtained.

Figure 11:
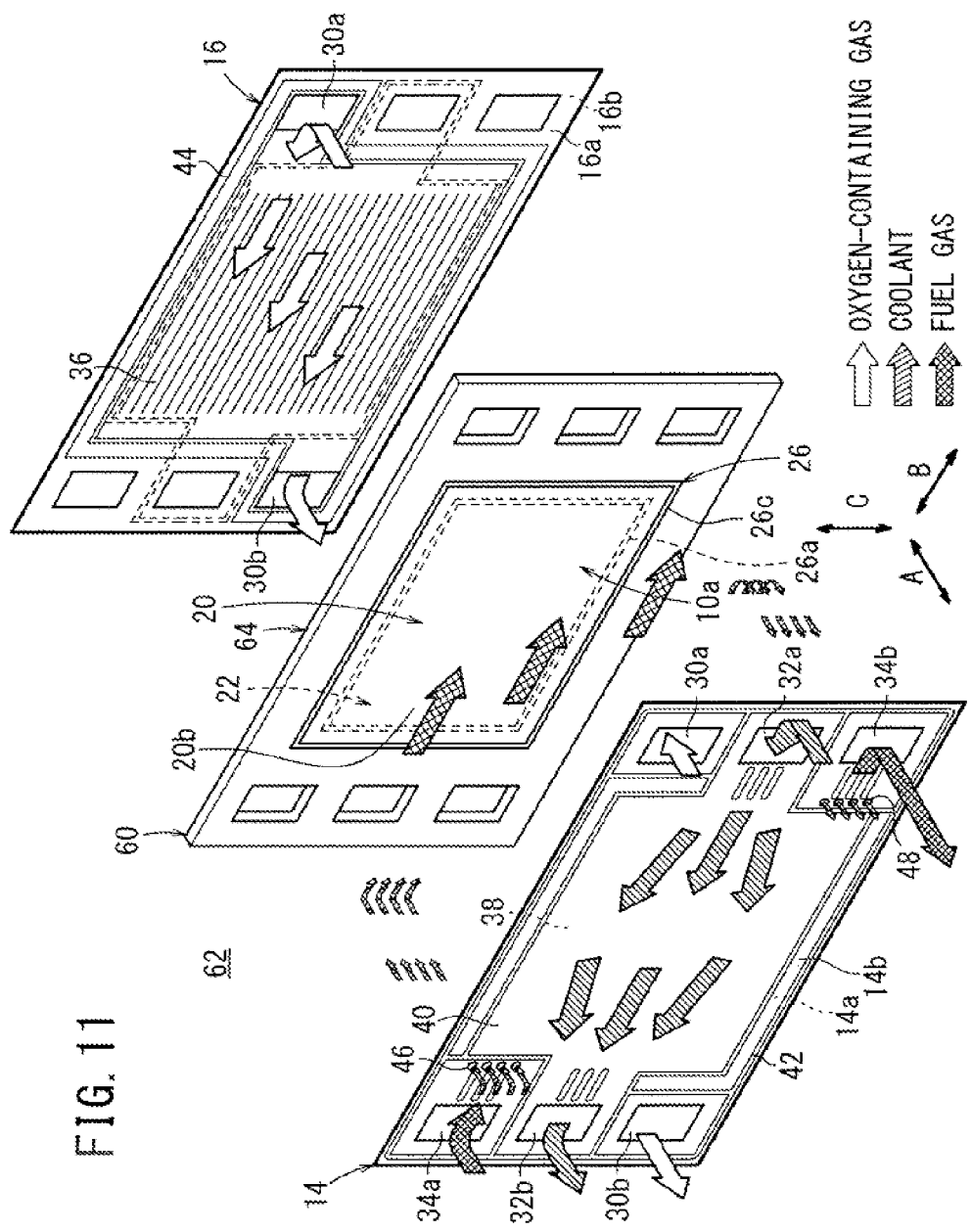
FIG. 11 is an exploded perspective view showing main components of a solid polymer electrolyte fuel cell including a resin frame equipped membrane electrode assembly according to a second embodiment of the present invention.

FIG. 11 is an exploded perspective view showing main components of a solid polymer electrolyte fuel cell 62 including a resin frame equipped membrane electrode assembly 60 according to a second embodiment of the present invention.

The constituent elements that are identical to those of the fuel cell 12 including the resin frame equipped membrane electrode assembly 10 according to the first embodiment are labeled with the same reference numerals, and descriptions thereof will be omitted. Likewise, also in third and subsequent embodiments described later, the constituent elements that are identical to those of the fuel cell 12 including the resin frame equipped membrane electrode assembly 10 according to the first embodiment are labeled with the same reference numerals, and descriptions thereof will be omitted.

The resin frame equipped membrane electrode assembly 60 includes a membrane electrode assembly 10a and a resin frame member 64. The resin frame member 64 is provided around the outer end of the solid polymer electrolyte membrane 18, and joined to the cathode 22 and the anode 20. The outer size of the resin frame member 64 is the same as the outer sizes of the first separator 14 and the second separator 16. The oxygen-containing gas supply passage 30a, the coolant supply passage 32a, the fuel gas discharge passage 34b, the fuel gas supply passage 34a, the coolant discharge passage 32b, and the oxygen-containing gas discharge passage 30b are formed in the outer marginal portion of the resin frame member 64.

In the second embodiment having the above structure, the intermediate layer 26 is provided between the resin frame member 64 and the membrane electrode assembly 10a, and the first impregnation layer 28a and the second impregnation layer 28b are provided for the gas diffusion layer 22b and the gas diffusion layer 20b, respectively.

Thus, in comparison with the case where the resin frame member 64 is joined to the cathode 22 and the anode 20 by adhesion, the joining strength for joining the resin frame member 64 to the cathode 22 and the anode 20 is improved suitably, and it is possible to suppress occurrence of peeling or the like as much as possible. Further, the same advantages as in the case of the first embodiment are obtained. For example, with the simple and economical structure, mixture of the fuel gas and the oxygen-containing gas can be suppressed as much as possible.

Figure 12:
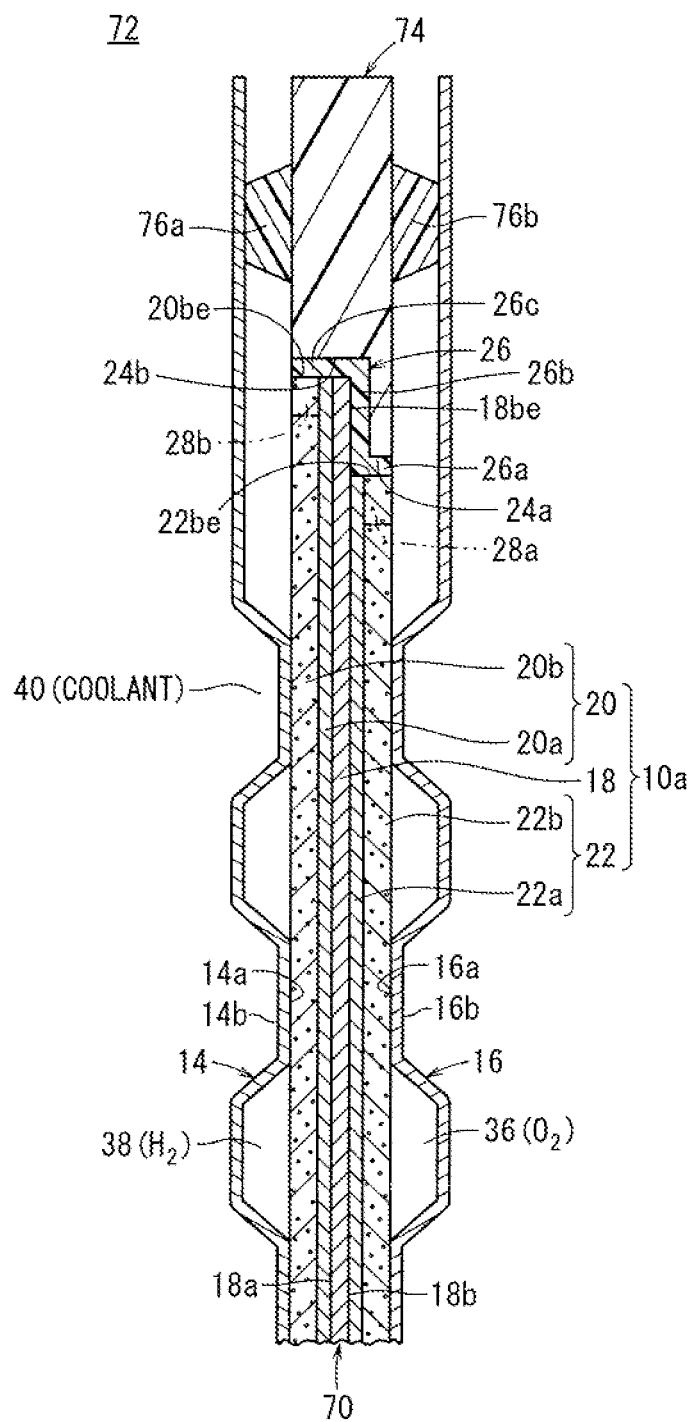
FIG. 12 is a cross sectional view showing a solid polymer electrolyte fuel cell including a resin frame equipped membrane electrode assembly according to a third embodiment of the present invention.

FIG. 12 is a cross sectional view showing a solid polymer electrolyte fuel cell 72 including a resin frame equipped membrane electrode assembly 70 according to a third embodiment of the present invention.

The resin frame equipped membrane electrode assembly 70 includes a membrane electrode assembly 10a and a resin frame member 74. The resin frame member 74 is provided around the outer end of the solid polymer electrolyte membrane 18, and joined to the cathode 22 and the anode 20. The outer size of the resin frame member 74 is the same as the outer sizes of the first separator 14 and the second separator 16. A seal member 76a is provided between the resin frame member 74 and the first separator 14, and a seal member 76b is provided between the resin frame member 74 and the second separator 16.

Figure 13:
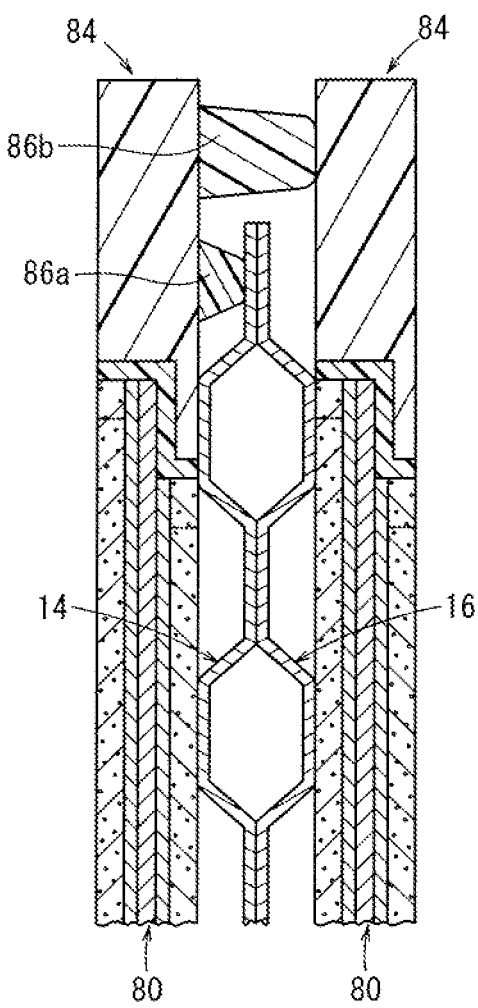
FIG. 13 is a cross sectional view showing a solid polymer electrolyte fuel cell including a resin frame equipped membrane electrode assembly according to a fourth embodiment of the present invention.

FIG. 13 is a cross sectional view showing a solid polymer electrolyte fuel cell 82 including a resin frame equipped membrane electrode assembly 80 according to a fourth embodiment of the present invention.

The resin frame equipped membrane electrode assembly 80 includes a membrane electrode assembly 10a and a resin frame member 84. The resin frame member 84 is provided around the outer end of the solid polymer electrolyte membrane 18, and joined to the cathode 22 and the anode 20. The outer size of the resin frame member 84 is larger than the outer sizes of the first separator 14 and the second separator 16. A seal member 86a is provided between the resin frame member 84 and the first separator 14, and a seal member 86b is provided between the adjacent resin frame members 84 outside the first separator 14 and the second separator 16.

In third and fourth embodiment having the above structure, the same advantages as in the cases of the first and second embodiments are obtained.

Figure 14:
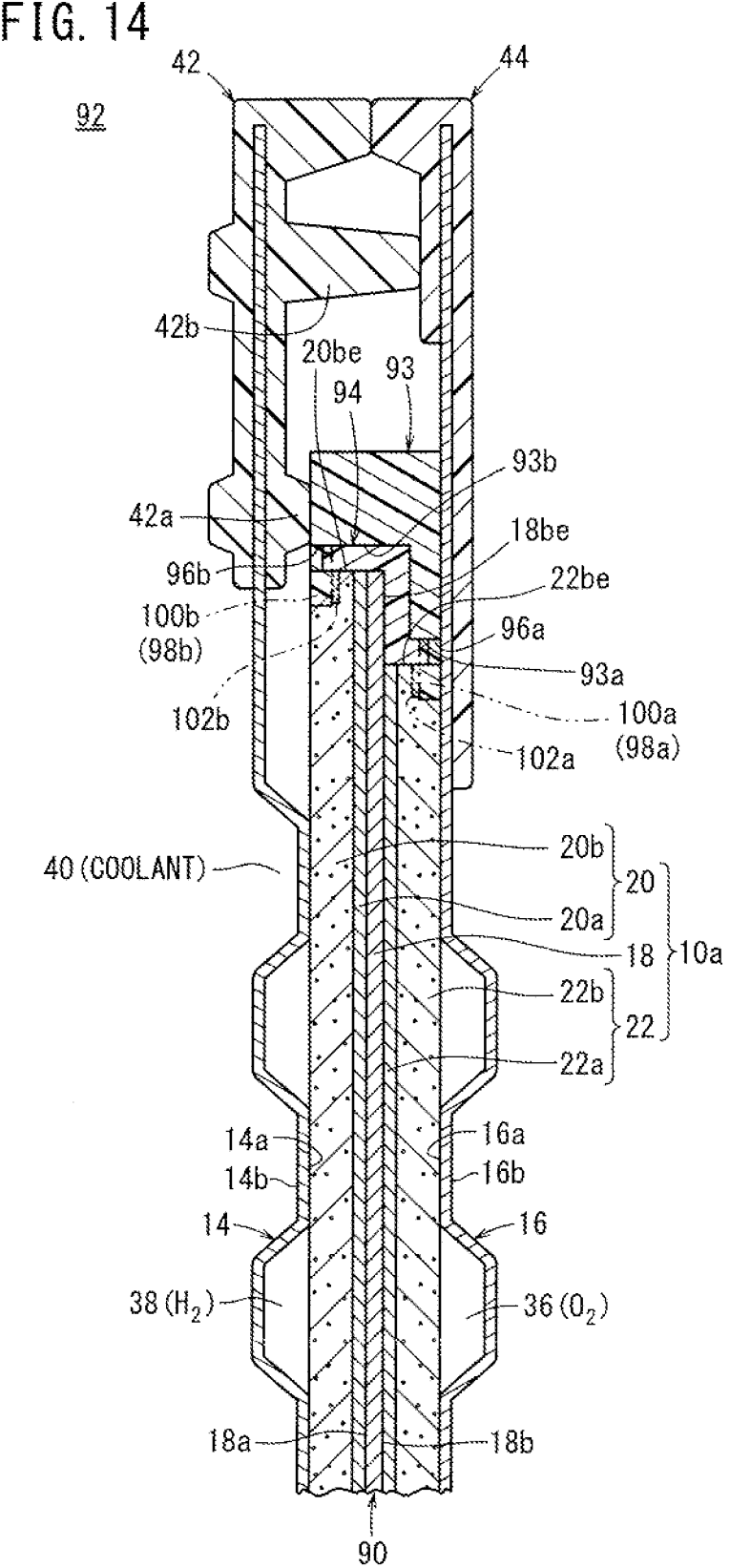
FIG. 14 is a cross sectional view showing a solid polymer electrolyte fuel cell including a resin frame equipped membrane electrode assembly according to a fifth embodiment of the present invention.

FIG. 14 is a cross sectional view showing a solid polymer electrolyte fuel cell 92 including a resin frame equipped membrane electrode assembly 90 according to a fifth embodiment of the present invention.

An intermediate layer 94 is provided between a resin frame member 93 and the membrane electrode assembly 10a of the resin frame equipped membrane electrode assembly 90. The intermediate layer 94 is made of the same material as the intermediate layer 26, and has a Z shape in cross section. A first gap 96a is formed between one end of the intermediate layer 94, the outer end 22be of the gas diffusion layer 22b of the cathode 22, and a first inner end 93a of the resin frame member 93. A second gap 96b is formed between the other end of the intermediate layer 94, the outer end 20be of the gas diffusion layer 20b of the anode 20, and a second inner end 93b of the resin frame member 93.

As described later, a first resin impregnation portion 100a is formed in the first gap 96a by melting a first projection 98a provided integrally with, or separately from the resin frame member 93. As described later, a second resin impregnation portion 100b is formed in the second gap 96b by melting a second projection 98b provided integrally with, or separately from the resin frame member 93.

The first resin impregnation portion 100a is partially overlapped with one end of the intermediate layer 94 by impregnation inside the gas diffusion layer 22b. The second resin impregnation portion 100b is partially overlapped with the other end of the intermediate layer 94 by impregnation inside the gas diffusion layer 20b. Adhesion layers 102a, 102b are provided at the gas diffusion layers 22b, 20b. The gas diffusion layers 22b, 20b are impregnated with the intermediate layer 94 partially to form the adhesive layers 102a, 102b.

Next, a method of producing the resin frame equipped membrane electrode assembly 90 will be described below.

Figure 15:
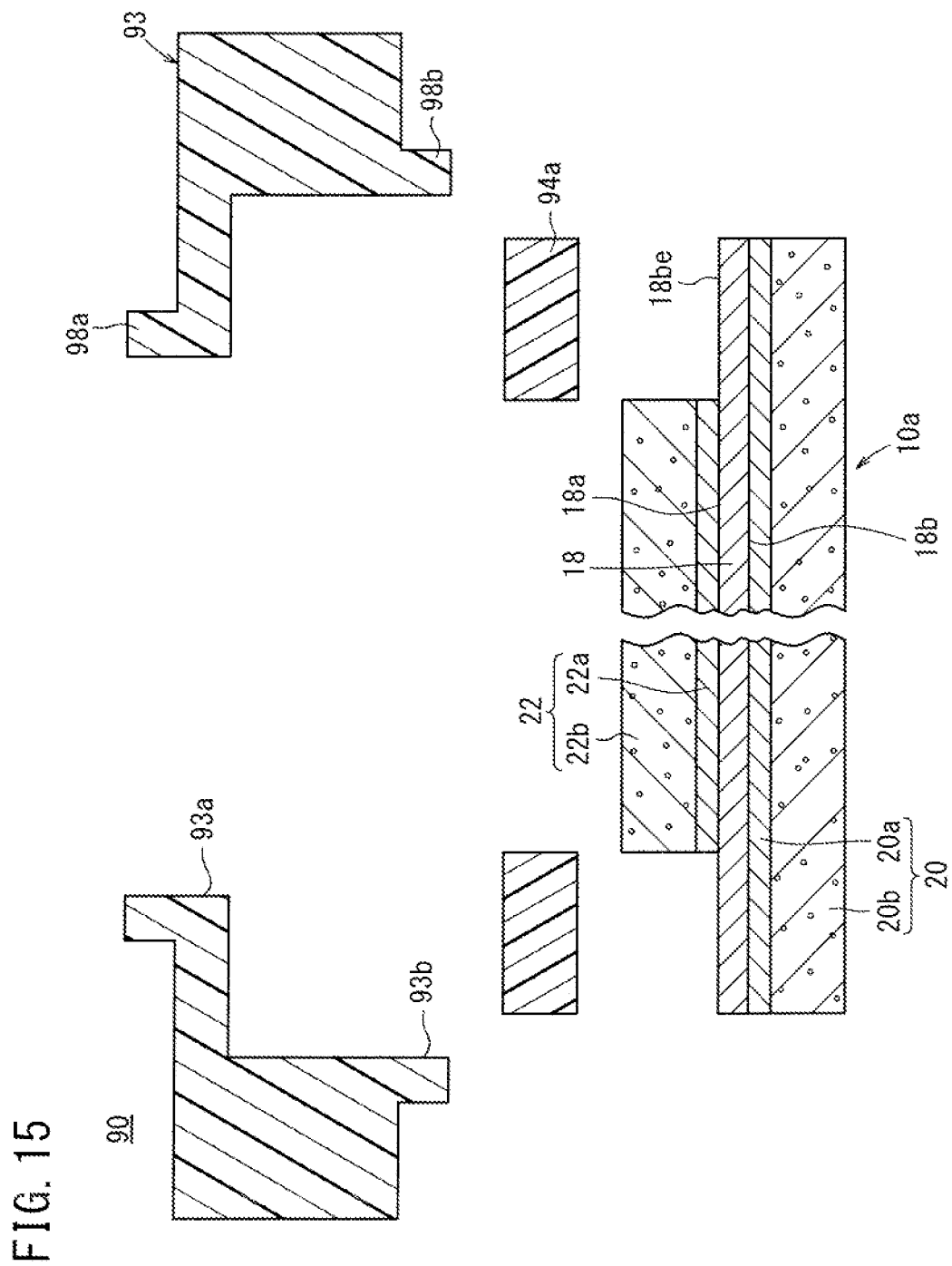
FIG. 15 is a view showing a method of producing the resin frame equipped membrane electrode assembly.

Firstly, as shown in FIG. 15, the resin frame member 93 is formed by an injection molding machine (not shown) beforehand. The frame shaped first projection 98a is formed integrally with one outer surface of the resin frame member 93 (outer surface adjacent to the first inner end 93a), around the first inner end 93a. The frame shaped second projection 98b is formed integrally with the other outer surface of the resin frame member 93 (outer surface adjacent to the second inner end 93b), around the second inner end 93b. Alternatively, the first projection 98a and the second projection 98b may be provided as frame members separate from the resin frame member 93, and overlapped with the resin frame member 93.

The resin frame member 93 is aligned with the membrane electrode assembly 10a, and a plate member 94a of the intermediate layer 94 is provided in correspondence with the outer end 18be of the solid polymer electrolyte membrane 18.

Figure 16:
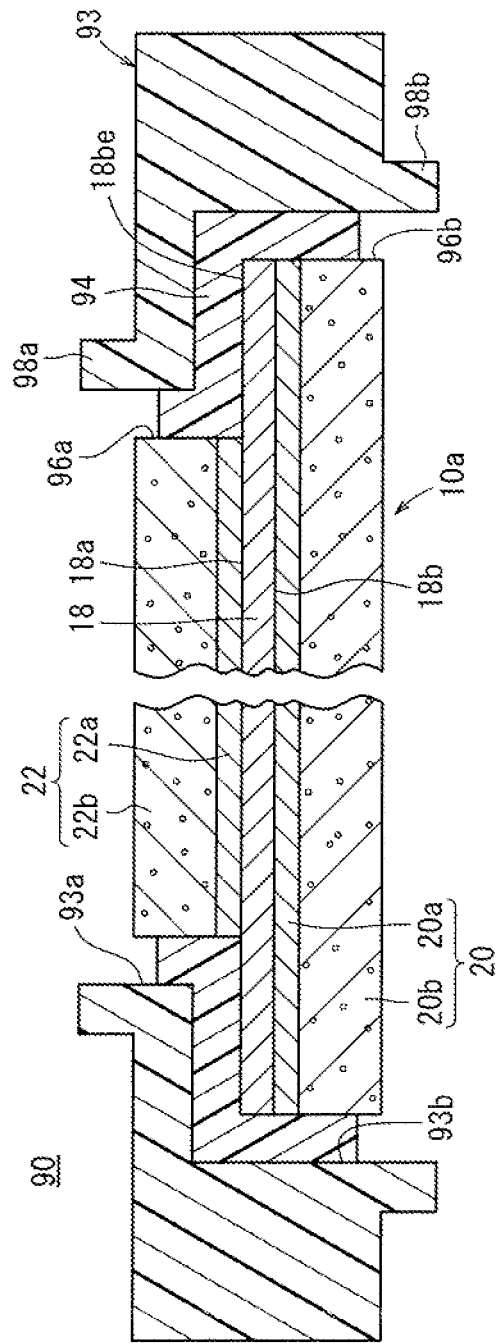
FIG. 16 is a view showing the method of producing the resin frame equipped membrane electrode assembly.

Then, as shown in FIG. 16, the resin frame member 93 and the membrane electrode assembly 10a are joined together through the plate member 94a such that the cathode 22 is provided at the first inner end 93a, and the solid polymer electrolyte membrane 18 and the anode 20 are provided at the second inner end 93b.

At this time, the plate member 94a is sandwiched between the resin frame member 93 and the membrane electrode assembly 10a. Thus, the plate member 94a enters between the first inner end 93a and the outer end 22be of the gas diffusion layer 22b of the cathode 22, and between the second inner end 93b and the outer end 20be of the gas diffusion layer 20b of the anode 20. As a result, the intermediate layer 94 formed in a substantially Z shape in cross section is obtained.

The first gap 96a is formed between one end of the intermediate layer 94, the outer end 22be of the gas diffusion layer 22b of the cathode 22, and the first inner end 93a of the resin frame member 93. Further, the second gap 96b is formed between the other end of the intermediate layer 94, the outer end 20be of the gas diffusion layer 20b of the anode 20, and the second inner end 93b of the resin frame member 93.

Figure 17:
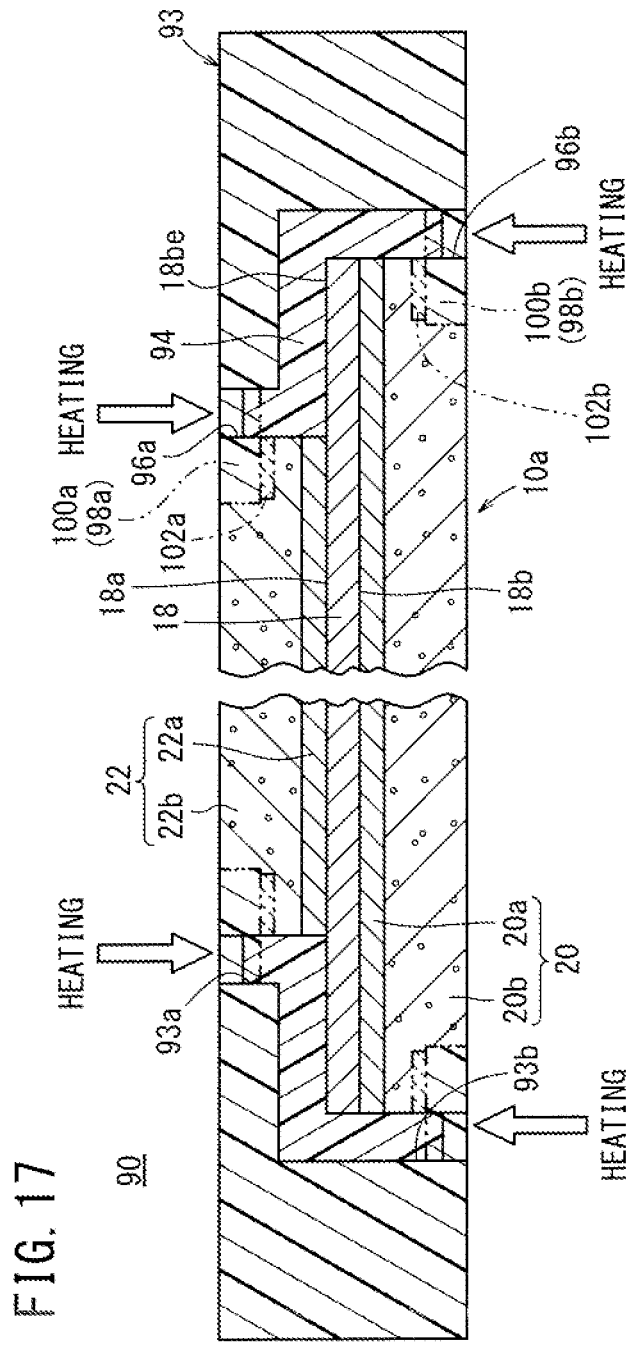
FIG. 17 is a view showing the method of producing the resin frame equipped membrane electrode assembly.
Figure 18:
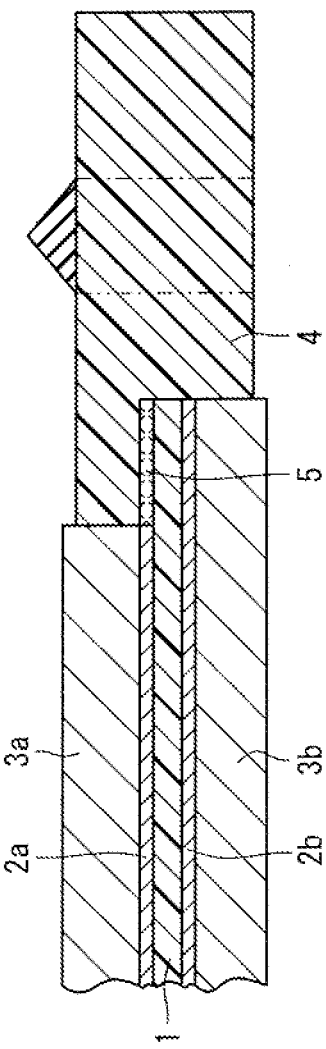
FIG. 18 is a view showing a membrane electrode assembly disclosed in Japanese Laid-Open Patent Publication No. 2007-066766.

Then, as shown in FIG. 17, the first projection 98a and the second projection 98b of the resin frame member 93 are heated. As a heating method, any of laser welding, infrared welding, and impulse welding, etc. is adopted.

Thus, the first projection 98a is melted by heating to cover the first gap 96a. The gas diffusion layer 22b of the cathode 22 is impregnated with the first projection 98a. The second projection 98b is melted by heating to cover the second gap 96b. The gas diffusion layer 20b of the anode 20 is impregnated with the second projection 98b. In this manner, the resin frame equipped membrane electrode assembly 90 is produced.

In the resin frame equipped membrane electrode assembly 90 according to the fifth embodiment produced as described above, the same advantages as in the cases of the first to fourth embodiments are obtained.

The invention claimed is:

1. A fuel cell resin frame equipped membrane electrode assembly comprising:
a membrane electrode assembly including a first electrode, a second electrode, and a solid polymer electrolyte membrane interposed between the first electrode and the second electrode, each of the first electrode and the second electrode including an electrode catalyst layer and a gas diffusion layer, the first electrode having an outer size smaller than that of the second electrode and that of the solid polymer electrolyte membrane; and
a resin frame member provided around an outer end of the solid polymer electrolyte membrane,
wherein:
an intermediate sealing layer is interposed between an inner end of the resin frame member and an outer peripheral edge of the membrane electrode assembly, the intermediate sealing layer comprising three plate portions that are integrally connected to one another, a first of said plate portions provided between an outer end of the first electrode and the inner end of the resin frame member,
a second of said plate portions being substantially perpendicular to the first plate portion and provided between an outer marginal portion of the solid polymer electrolyte membrane and the resin frame member, the outer marginal portion of the solid polymer electrolyte membrane extending outwardly beyond the outer end of the first electrode, and
a third of said plate portions being substantially parallel to the first plate portion and provided between an outer end of the second electrode and the inner end of the resin frame member,
the membrane electrode assembly is sandwiched between a first separator and a second separator, the first separator and the second separator having gas flow fields on their surfaces in abutment with the membrane electrode assembly;
the outer marginal portion of the solid polymer electrolyte membrane extending outwardly beyond the first electrode is supported by the gas diffusion layer of the second electrode through the electrode catalyst layer of the second electrode provided on a rear surface of the outer marginal portion of the solid polymer electrolyte membrane;
a first filled gap is formed between one end of the intermediate sealing layer, the outer end of the first electrode, and the inner end of the resin frame member;
a second filled gap is formed between another end of the intermediate sealing layer, the outer end of the second electrode, and the inner end of the resin frame member; and
the membrane electrode assembly further comprises at least one of:
a first resin impregnation portion formed in the first filled gap, the first resin impregnation portion being partially overlapped with the one end of the intermediate sealing layer and having a resin impregnation portion inside the gas diffusion layer of the first electrode, the first resin impregnated portion being formed from material which is the same as the material of the resin frame member which has been melted into part of the gas diffusion layer, and
a second resin impregnation portion formed in the second filled gap, the second resin impregnation portion being partially overlapped with the other end of the intermediate sealing layer and having a resin impregnation portion inside the gas diffusion layer of the second electrode, the second resin impregnated portion being formed from material which is the same as the material of the resin frame member which has been melted into part of the gas diffusion layer.

2. The fuel cell resin frame equipped membrane electrode assembly according to claim 1, wherein the intermediate sealing layer is made of material different from that of the resin frame member.

3. The fuel cell resin frame equipped membrane electrode assembly according to claim 1, wherein an outer end marginal portion of at least one of the gas diffusion layers is impregnated with a same material composition as that of the intermediate sealing layer to form an impregnation layer.

4. The fuel cell resin frame equipped membrane electrode assembly according to claim 3, wherein the gas diffusion layer is impregnated with the impregnation layer at a pore filling rate of 85% or more.

5. The fuel cell resin frame equipped membrane electrode assembly according to claim 1, wherein the intermediate sealing layer has a substantial Z shape as viewed in cross section.

6. The fuel cell resin frame equipped membrane electrode assembly according to claim 1, wherein the second plate portion extends in a direction substantially parallel to the solid polymer electrolyte membrane.

7. The fuel cell resin frame equipped membrane electrode assembly according to claim 1, wherein each of the first plate portion and the third plate portion extends in a direction substantially perpendicular to the membrane electrode assembly.

* * * * *